US008749445B2

(12) United States Patent
Ishida et al.

(10) Patent No.: US 8,749,445 B2
(45) Date of Patent: Jun. 10, 2014

(54) VARIABLE CAPACITANCE DEVICE, ANTENNA MODULE, AND COMMUNICATION APPARATUS

(75) Inventors: Takehisa Ishida, Tokyo (JP); Nobuyuki Nagai, Kanagawa (JP); Yusaku Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 13/253,545

(22) Filed: Oct. 5, 2011

(65) Prior Publication Data

US 2012/0092228 A1 Apr. 19, 2012

(30) Foreign Application Priority Data

Oct. 15, 2010 (JP) ................................ 2010-232754

(51) Int. Cl.
*H01G 5/01* (2006.01)
*H01Q 1/50* (2006.01)

(52) U.S. Cl.
USPC .......................................... 343/861; 361/277

(58) Field of Classification Search
USPC ......................................................... 343/861
See application file for complete search history.

(56) References Cited

U.S. PATENT DOCUMENTS

| | | | | |
|---|---|---|---|---|
| 6,935,042 | B2 * | 8/2005 | Bonham et al. | 33/645 |
| 7,147,604 | B1 * | 12/2006 | Allen et al. | 600/549 |
| 2003/0124944 | A1 * | 7/2003 | Kyogaku et al. | 445/6 |
| 2003/0136992 | A1 | 7/2003 | Adan | |
| 2006/0279469 | A1 * | 12/2006 | Adachi et al. | 343/767 |
| 2009/0115289 | A1 * | 5/2009 | Asada | 310/328 |
| 2009/0306633 | A1 * | 12/2009 | Trovato et al. | 604/891.1 |
| 2010/0142117 | A1 * | 6/2010 | Shimanouchi et al. | 361/278 |
| 2010/0213789 | A1 * | 8/2010 | Igarashi | 310/300 |
| 2011/0120221 | A1 * | 5/2011 | Yoda | 73/514.32 |

FOREIGN PATENT DOCUMENTS

| | | |
|---|---|---|
| JP | 61-042870 | 3/1986 |
| JP | 5-74655 | 3/1993 |
| JP | 06-111971 | 4/1994 |
| JP | 2003-218217 | 7/2003 |
| JP | 2005-259488 | 9/2005 |
| JP | 2007-287468 | 11/2007 |
| JP | 2009-170677 | 7/2009 |
| JP | 2010-135614 | 6/2010 |
| JP | 2010-199214 | 9/2010 |

OTHER PUBLICATIONS

Japanese Patent Office, Notification of Reason for Refusal issued in connection with Japanese Patent Application No. 2010-232754, dated Apr. 2, 2014. (7 pages).

* cited by examiner

*Primary Examiner* — Jerome Jackson, Jr.
*Assistant Examiner* — Andrea Lindgren Baltzell
(74) *Attorney, Agent, or Firm* — K&L Gates LLP

(57) ABSTRACT

A variable capacitance device includes a fixing member, a fixed electrode having a first end side fixed by the fixing member, an actuator element having a first end side fixed by the fixing member directly or indirectly, a movable electrode provided to connect to the actuator element directly or indirectly and disposed to approximately face the fixed electrode, and a driving section deforming a second end side of the actuator element, to change a distance between the fixed electrode and the movable electrode.

14 Claims, 13 Drawing Sheets

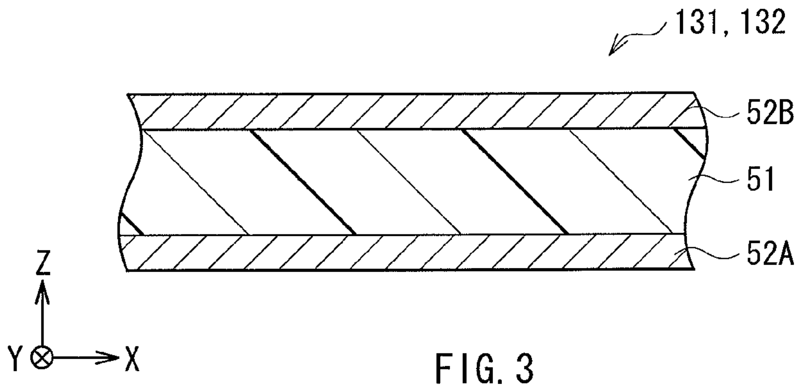
FIG. 3
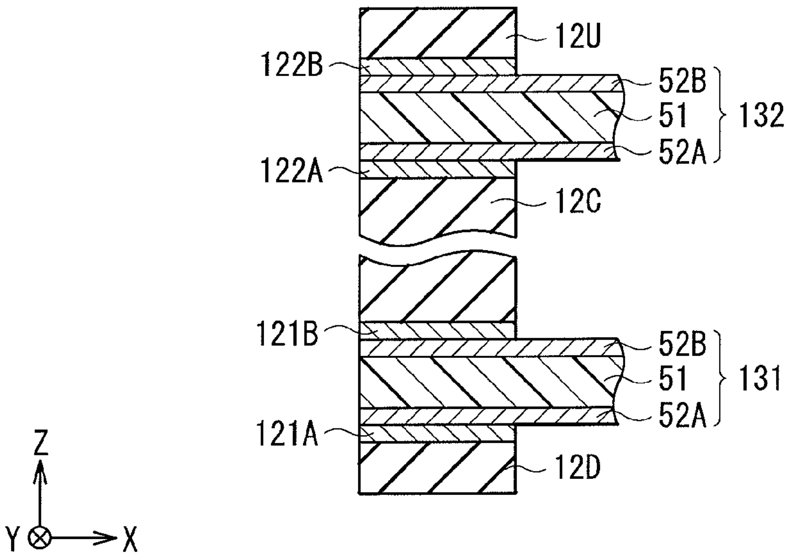
FIG. 4
FIG. 5A
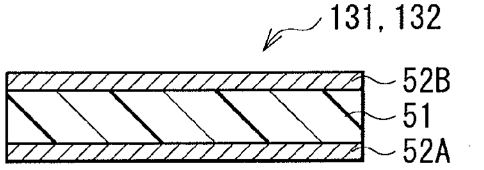
FIG. 5B
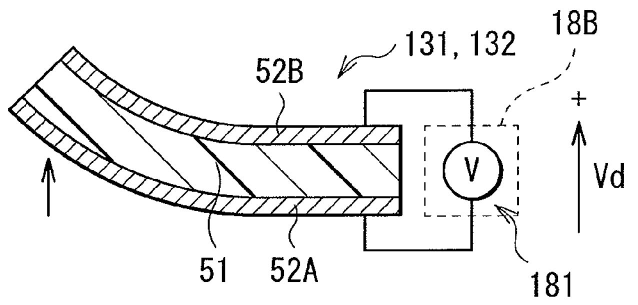

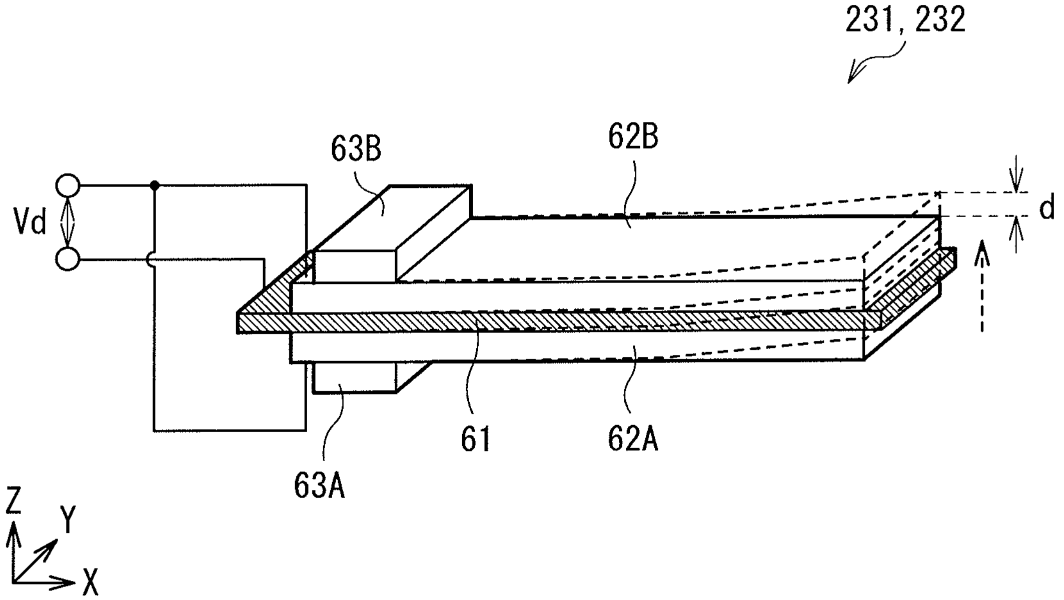
FIG. 15
FIG. 16A
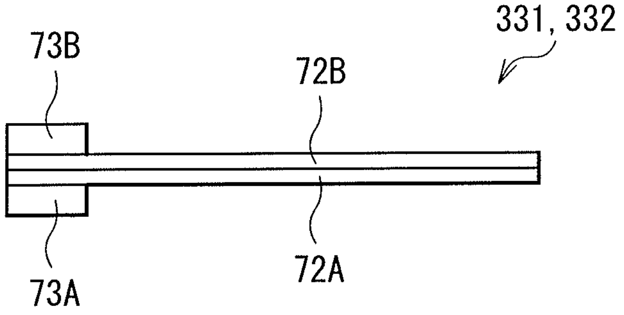
FIG. 16B
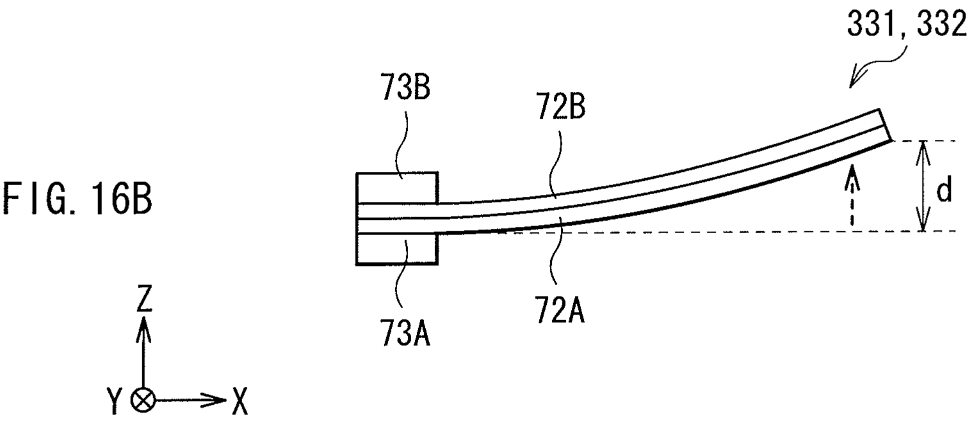

VARIABLE CAPACITANCE DEVICE, ANTENNA MODULE, AND COMMUNICATION APPARATUS

CROSS REFERENCES TO RELATED APPLICATIONS

The present application claims priority to Japanese Priority Patent Application JP 2010-232754 filed in the Japan Patent Office on Oct. 15, 2010, the entire content of which is hereby incorporated by reference.

BACKGROUND

The present application relates to a variable capacitance device configured by using a predetermined actuator element, and also relates to an antenna module and a communication apparatus provided with such a variable capacitance device.

Recently, elements having various kinds of structure have been developed as a variable capacitance element in which a capacitance value may be changed (a capacitance value is variable). Such variable capacitance elements include, for example, air variable capacitors, poly variable capacitors, ceramic trimmer capacitors, varicaps, and the like (for example, see Japanese Unexamined Patent Application Publications No. 05-74655 and No. 2003-218217).

SUMMARY

However, in such a currently-available variable capacitance element (variable capacitance device), the extent of a capacitance change range is insufficient (as having, for example, approximately 5 to 15 times variable magnifications). Therefore, in recent years, a proposal of a variable capacitance element (variable capacitance device) that may realize a capacitance change range larger than before (larger variable magnification) has been desired.

In view of the foregoing, it is desirable to provide a variable capacitance device that may achieve a capacitance change range wider than before, and an antenna module as well as a communication apparatus having such a variable capacitance device.

According to an embodiment, there is provided a variable capacitance device including a fixing member, a fixed electrode having a first end side fixed by the fixing member, and an actuator element having a first end side fixed by the fixing member directly or indirectly, and a movable electrode provided to connect to the actuator element directly or indirectly, and disposed to approximately face the fixed electrode. The variable capacitance device further includes a driving section deforming a second end side of the actuator element, to change a distance between the fixed electrode and the movable electrode.

According to an embodiment, there is provided an antenna module including an antenna element, and the above-described variable capacitance in the embodiment.

According to an embodiment, there is provided a communication apparatus including the above-described antenna module in the embodiment.

In the variable capacitance device, the antenna module, and the communication apparatus according to the embodiments, a capacitive element is formed based on the fixed electrode and the movable electrode disposed to approximately face each other, and a space region (a gap) therebetween. When the second end side of the actuator element deforms to change the distance between the fixed electrode and the movable electrode, thereby causing the (electrostatic) capacitance value of this capacitive element to change, the capacitive element functions as a variable capacitance element. Here, the deformation volume of such an actuator element is a relatively large and thus, the amount of a change in the distance between the fixed electrode and the movable electrode also becomes large.

According to the variable capacitance device, the antenna module, and the communication apparatus in the embodiments, the second end side of the actuator element is caused to deform so that the distance between the fixed electrode and the movable electrode changes and thus, it is possible to increase the amount of a change in the distance between the fixed electrode and the movable electrode. Therefore, it is possible to greatly change the capacitance value of the capacitive element formed using these fixed electrode and movable electrode, and a capacitance change range wider than before (a variable magnification larger than before) may be realized.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the application, and are incorporated in and constitute a part of this specification.

FIG. 3 is a cross-sectional diagram illustrating an example of a detailed configuration of a polymer actuator element illustrated in FIG. 1.

FIG. 4 is a cross-sectional diagram illustrating a detailed configuration of a part of the polymer actuator element, a fixing member, and the fixed electrode illustrated in FIG. 1.

FIGS. 5A and 5B are cross-sectional schematic diagrams for explaining basic operation of the polymer actuator element.

FIG. 15 is a schematic diagram illustrating a schematic configuration and operation of a piezoelectric element serving as an actuator element according to a modification 5.

FIGS. 16A and 16B are schematic diagrams illustrating a schematic configuration and operation of a bimetallic element serving as an actuator element according to a modification 6.

DETAILED DESCRIPTION

Embodiments of the present application will be described below in detail with reference to the drawings.

1. Embodiment (an example in which one variable capacitance element is formed between a fixed electrode and a movable electrode in a set)

2. Modifications

Modification 1 (an example in which two variable capacitance elements are each formed between a fixed electrode and a movable electrode in each of two sets)

Modification 2 (an example in which a capacitance value of a monitoring variable capacitance element is detected, and a deformation volume of an actuator element is controlled)

Modification 3 (an example 1 in which a displacement magnitude of a movable electrode is detected, and thereby a deformation volume of an actuator element is controlled: an example of detection using a magnet and a Hall element)

Modification 4 (an example 2 in which a displacement magnitude of a movable electrode is detected, and thereby a deformation volume of an actuator element is controlled: an example of detection using a reflection member and a photoreflector)

Modification 5 (an example in which a piezoelectric element is used as an actuator element)

Modification 6 (an example in which a bimetallic element is used as an actuator element)

3. Application Example (an example in which a variable capacitance device is applied to an antenna module and a communication apparatus)

Embodiment

Overall Configuration of Variable Capacitance Device 1

Figure 1:
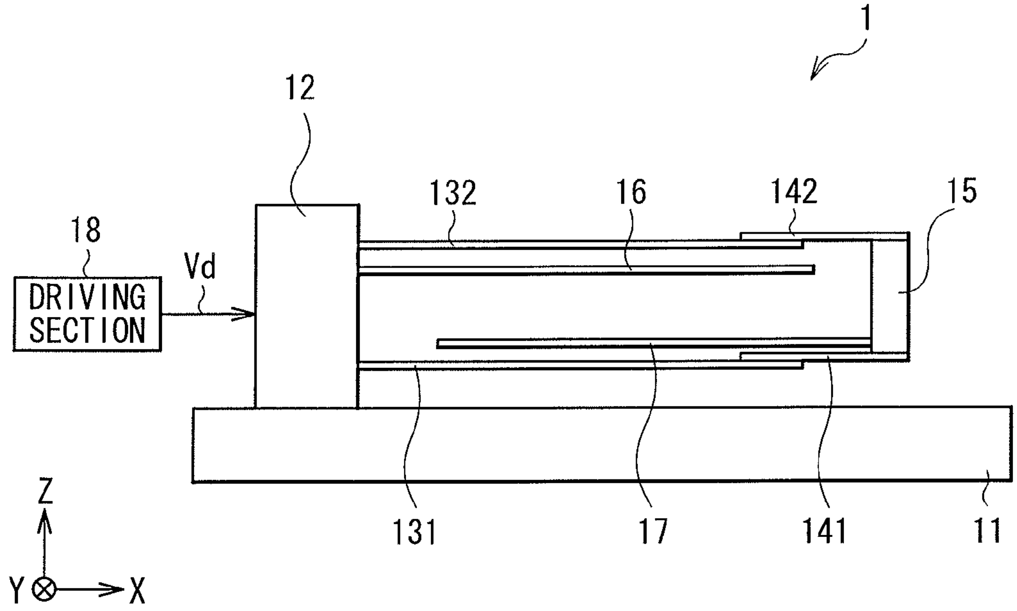
FIG. 1 is a schematic diagram illustrating a schematic configuration of a variable capacitance device according to an embodiment.

FIG. 1 schematically illustrates an overall configuration (a schematic configuration) of a variable capacitance device (a variable capacitance device 1) according to an embodiment, in a side view (a Z-X side view). This variable capacitance device 1 includes a support member 11, a fixing member 12, polymer actuator elements 131 and 132, link members 141 and 142, a connection member 15, a fixed electrode 16, a movable electrode 17, and a driving section 18.

Here, the support member 11 is a base member (a substrate) to support the entire variable capacitance device 1 and here, the support member 11 is disposed to extend on an XY plane. This support member 11 is made of, for example, a hard resin material such as a liquid crystal polymer.

The fixing member 12 is a member to fix one end side of each of the polymer actuator elements 131 and 132 and one end side of the fixed electrode 16, and is made of, for example, a hard resin material such as a liquid crystal polymer. Although details will be described later (FIG. 4), this fixing member 12 includes three members that are a lower fixing member 12D, a middle (central) fixing member 12C, and an upper fixing member 12U disposed along a forward direction of a Z axis.

Each of the polymer actuator elements 131 and 132 has the one end side directly fixed by the fixing member 12, and is an actuator element to drive (deform) the movable electrode 17 along the Z axis via the link members 141 and 142 and the connection member 15 to be described later. These polymer actuator elements 131 and 132 each have a driving surface (a driving surface on the X-Y plane) orthogonal to a displacement direction (shifting direction) of the movable electrode 17 to be described later, and are disposed so that the respective driving surfaces face each other along the Z axis. The polymer actuator elements 131 and 132 correspond to a specific example of "the actuator element" according to the embodiment. It is to be noted that a configuration of each of the polymer actuator elements 131 and 132 will be described later in detail (FIG. 3).

The link members 141 and 142 are members to link (connect) the other ends of the polymer actuator elements 131 and 132, respectively, with corresponding end parts of the connection member 15 to be described later. Specifically, the link member 141 links a lower end part of the connection member 15 with the other end of the polymer actuator element 131, and the link member 142 links an upper end part of the connection member 15 with the other end of the polymer actuator element 132. It is desirable that each of these connection members 141 and 142 be, for example, a flexible film such as a polyimide film or the like, and be made of a flexible material having rigidity comparable to or less than (preferably, equal to or lower than) that of each of the polymer actuator elements 131 and 132. This provides the link members 141 and 142 with flexibility in curving in the direction opposite to a curving direction of the polymer actuator elements 131 and 132, and thereby a cross-section at a cantilever including the polymer actuator elements 131 and 132 and the link members 141 and 142 takes the shape of a letter S. As a result, the connection member 15 is allowed to move in parallel with a Z-axis direction, and the movable electrode 17 is driven in the Z-axis direction while keeping a state of being parallel with the fixed electrode 16.

The connection member 15 is a member to make connection between the other end side of each of the polymer actuator elements 131 and 132 and one end side of the movable electrode 17 to be described later (specifically, between the other end of each of the link members 141 and 142 and the one end of the movable electrode 17). Here, this connection member 15 is disposed to extend in the Z-axis direction, and is made of, for example, a hard resin material such as a liquid crystal polymer.

The fixed electrode 16 is an electrode whose one end side is fixed by the fixing member 12, and is flat-shaped to extend on the XY plane here. This fixed electrode 16 is disposed between the polymer actuator elements 131 and 132 in a pair.

The movable electrode 17 is an electrode whose one end side is fixed by the connection member 15, and is disposed on the other end sides of the polymer actuator elements 131 and 132, via the link members 141 and 142 and the connection member 15 described above. In other words, the movable electrode 17 is provided to indirectly connect to the polymer actuator elements 131 and 132. Here, this movable electrode 17 is also flat-shaped to extend on the XY plane, and disposed between the polymer actuator elements 131 and 132 in the pair (specifically, between the polymer actuator element 131 and the fixed electrode 16). That is to say, the movable electrode 17 is disposed to approximately face (preferably, opposite) the fixed electrode 16 along the Z-axis direction. Although details will be described later, this movable electrode 17 is allowed to shift in the Z-axis direction, according to a displacement (a displacement in the Z-axis direction) of the connection member 15 based on deformation of the polymer actuator elements 131 and 132.

Figure 2:
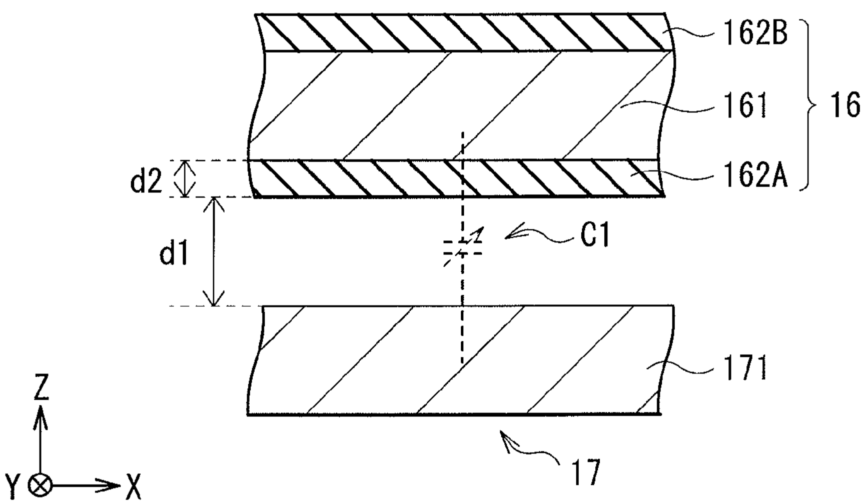
FIG. 2 is a cross-sectional diagram illustrating an example of a detailed configuration of a fixed electrode and a movable electrode illustrated in FIG. 1

FIG. 2 is a cross-sectional diagram (a Z-X cross-sectional diagram) illustrating an example of a detailed configuration of the fixed electrode 16 and the movable electrode 17.

The fixed electrode 16 has a layered structure including a conductor layer 161, and a pair of dielectric layers 162A and 162B provided on both sides of the conductor layer 161. On the other hand, the movable electrode 17 has a single-layer structure including a conductor layer 171. Each of the conductor layers 161 and 171 is made of, for example, a metallic material such as copper (Cu) or aluminum (Al). In addition, each of the dielectric layers 162A and 162B is made of, for example, a high dielectric material such as barium titanate, tantalum oxide, vinylidene fluoride, or phenolic resin. Based on such a cross-sectional configuration, the pair of conductor layers 161 and 171, a space region (gap) (air space in this case) between the conductor layers 161 and 171 in the pair, and the dielectric layer 162A (the dielectric layer on the movable electrode 17 side) form a capacitive element (a variable capacitance element) C1 made of a capacitance. Here, when the distance between the fixed electrode 16 and the movable electrode 17 is assumed to be d1, the thickness of the dielectric layer 162A is assumed to be d2, the area of a region where the fixed electrode 16 and the movable electrode 17 face each other (i.e., an area on the XY plane) is assumed to be S, the dielectric constant of the air space mentioned above is assumed to be $\epsilon 1$ (=1), and the dielectric constant of the dielectric layer 162A is assumed to be $\epsilon 2$, a (electrostatic) capacitance value C of the capacitive element C1 is expressed by the following expression (1). It is to be noted that the thickness d2 is, for example, around 0.3 mm, and the dielectric constant $\epsilon 2$ is, for example, around 6 in a case where the vinylidene fluoride mentioned above is used.

$$C=(\epsilon 1\times\epsilon 2\times S)/(\epsilon 2\times d1+\epsilon 1\times d2) \quad (1)$$

The driving section 18 is provided to drive (deform) each of the polymer actuator elements 131 and 132, and is, for example, configured by using an electric circuit employing a semiconductor element or the like. This driving section 18 has, specifically, a voltage supply section 181 to be described later, and supplies a driving voltage Vd to each of the polymer actuator elements 131 and 132 by using the voltage supply section 181. It is to be noted that driving operation of the polymer actuator elements 131 and 132 by this driving section 18 will be described later in detail.

Detailed Configuration of Polymer Actuator Elements 131 and 132

Next, with reference to FIG. 3 and FIG. 4, a detailed configuration of each of the polymer actuator elements 131 and 132 will be described. FIG. 3 illustrates a cross-sectional configuration (a Z-X cross-sectional configuration) of each of the polymer actuator elements 131 and 132. Further, FIG. 4 is a cross-sectional diagram (a Z-X cross-sectional diagram) illustrating a detailed configuration of a part of the polymer actuator elements 131 and 132, the fixing member 12, and fixed electrodes 121A, 121B, 122A, and 122B to be described later.

As illustrated in FIG. 3, each of the polymer actuator elements 131 and 132 has a cross-sectional structure in which a pair of electrode films 52A and 52B are formed on both sides of an ionic conductive polymer compound film 51 (hereinafter merely referred to as a polymer compound film 51). In other words, each of the polymer actuator elements 131 and 132 has the pair of electrode films 52A and 52B, and the polymer compound film 51 inserted between these electrode films 52A and 52B. It is to be noted that a portion around the polymer actuator elements 131 and 132 and the electrode films 52A and 52B may be covered with an insulating protective film made of a material having high elasticity (for example, polyurethane or the like).

Further, for example, as illustrated in FIG. 4, the polymer actuator elements 131 and 132 are connected to the upper fixing member 12U, the middle fixing member 12C, the lower fixing member 12D of the fixing member 12, and the fixed electrodes 121A, 121B, 122A, and 122B. Specifically, in the polymer actuator element 131, the electrode film 52A is electrically connected to the fixed electrode 121A on the lower fixing member 12D side, and the electrode film 52B is electrically connected to the fixed electrode 121B on the middle fixing member 12C side. On the other hand, in the polymer actuator element 132, the electrode film 52A is electrically connected to the fixed electrode 122A on the middle fixing member 12C side, and the electrode film 52B is electrically connected to the fixed electrode 122B on the upper fixing member 12U side. As a result, the driving voltage Vd supplied from the driving section 18 (the voltage supply section 181) described above is supplied to the polymer actuator element 131 via the fixed electrodes 121A and 121B, and also supplied to the polymer actuator element 132 via the fixed electrodes 122A and 122B.

It is desirable that each member and each electrode from the fixed electrode 121A on the lower fixing member 12D side to the fixed electrode 122B on the upper fixing member 12U side be fixed by being pressed with a constant pressure by a not-illustrated pressing member (a flat spring). This prevents the polymer actuator elements 131 and 132 from being destroyed even when a large force is exerted thereon, and allows stable electric connection even when the polymer actuator elements 131 and 132 are deformed.

The polymer compound film 51 described above is configured to be curved by a predetermined potential difference occurring between the electrode films 52A and 52B. This polymer compound film 51 is impregnated with an ionic substance. The "ionic substance" here refers to ions in general, which may be conveyed in the polymer compound film 51, and specifically means a substance containing a simple substance of hydrogen ions or metal ions, or any of these cations and/or anions and a polar solvent, or a substance containing cations and/or anions which themselves are liquid such as imidazolium salt. For example, as the former, there is a substance in which a polar solvent is solvated in cations and/or anions, and as the latter, there is an ionic liquid.

As a material of the polymer compound film 51, there is, for example, an ion exchange resin in which a fluorocarbon resin or a hydrocarbon system is a skeleton. As the ion exchange resin, it is preferable to use a cation exchange resin when a cationic substance is impregnated, and use an anion exchange resin when an anionic substance is impregnated.

As the cation exchange resin, there is, for example, a resin into which an acidic group such as a sulfonate group or a carboxyl group is introduced. Specifically, the cation exchange resin is a polyethylene having an acidic group, a polystyrene having an acidic group, a fluorocarbon resin having an acid group, or the like. Above all, a fluorocarbon resin having a sulfonate group or a carboxylic acid group is preferable as the cation exchange resin, and there is, for example, Nafion (made by E.I. du Pont de Nemours and Company).

The cationic substance impregnated in the polymer compound film 51 may be organic or inorganic, or may be of any kind. For example, various kinds of mode such as a simple substance of metal ions, a substance containing metal ions and water, a substance containing organic cations and water, or an ionic liquid are applicable. As the metal ion, there is, for example, light metal ion such as sodium ion ($Na+$), potassium ion ($K+$), lithium ion ($Li+$), or magnesium ion ($Mg2+$). Further, as the organic cation, there is, for example, alkylammonium ion. These cations exist as a hydrate in the polymer compound film 51. Therefore, in a case where the polymer compound film 51 is impregnated with the cationic substance containing cations and water, it is desirable to seal the whole in order to suppress volatilization of water, in the polymer actuator elements 131 and 132.

The ionic liquid is also called ambient temperature molten salt, and includes cations and anions having low combustion and volatility. As the ionic liquid, there is, for example, an imidazolium ring system compound, a pyridinium ring system compound, an aliphatic compound, or the like.

Above all, it is preferable that the cationic substance be the ionic liquid. This is because the volatility is low, and the polymer actuator elements 131 and 132 work well even in a high-temperature atmosphere or in a vacuum.

Each of the electrode films 52A and 52B facing each other across the polymer compound film 51 interposed therebetween includes one or more than one kind of conductive material. It is preferable that each of the electrode films 52A and 52B be a film in which particles of a conductive material powder are bound by an ionic conductive polymer. This is because flexibility of the electrode films 52A and 52B increases. A carbon powder is preferable as the conductive material powder. This is because the conductivity is high, and the specific surface area is large and thus, a larger deformation volume is achieved. As the carbon powder, Ketjen black is preferable. As the ionic conductive polymer, the same material as that of the polymer compound film 51 is desirable.

The electrode films 52A and 52B are formed as follows, for example. A coating in which a conductive material powder and a conductive polymer are dispersed in a dispersion medium is applied to both sides of the polymer compound film 51, and then dried. Alternatively, a film-shaped substance including a conductive material powder and an ionic conductive polymer may be affixed to both sides of the polymer compound film 51 by pressure bonding.

The electrode films 52A and 52B may each have a multilayer structure, and in that case, it is desirable that each of the electrode films 52A and 52B have such a structure that a layer in which particles of a conductive material powder are bound by an ionic conductive polymer and a metal layer are laminated sequentially from the polymer compound film 51 side. This is because an electric potential becomes closer to a further uniform value in an in-plane direction of the electrode films 52A and 52B, and superior deformability is obtained. As a material of the metal layer, there is a noble metal such as gold or platinum. The thickness of the metal layer is arbitrary, but the metal layer is preferably a continuous film so that the electric potential becomes uniform in the electrode films 52A and 52B. As a method of forming the metal layer, there is plating, deposition, sputtering, or the like.

The size (width and length) of the polymer compound film 51 may be, for example, freely set according to the size or and weight of the movable electrode 17, or a desirable displacement magnitude (deformation volume) of the polymer compound film 51. The displacement magnitude of the polymer compound film 51 is set according to a desired displacement magnitude (the amount of a movement along the Z-axis direction) of the movable electrode 17.

Operation and Effect of Variable Capacitance Device 1

Next, the operation and effect of the variable capacitance device 1 of the present embodiment will be described.

1. Operation of Polymer Actuator Elements 131 and 132

First, the operation of the polymer actuator elements 131 and 132 will be described with reference to FIGS. 5A and 5B. FIGS. 5A and 5B each schematically illustrate the operation of the polymer actuator elements 131 and 132, using a cross-sectional diagram.

At first, a case where a substance including cations and a polar solvent is used as the cationic substance will be described.

In this case, the cationic substance disperses approximately uniformly in the polymer compound film 51 and thus, the polymer actuator elements 131 and 132 in a state of no voltage application become flat without curving (FIG. 5A). Here, when a voltage applied state is established using the voltage supply section 181 in the driving section 18 illustrated in FIG. 5B (when application of the driving voltage Vd begins), the polymer actuator elements 131 and 132 each exhibit the following behavior. When, for example, the predetermined voltage Vd is applied between the electrode films 52A and 52B so that the electrode film 52A is at a negative potential whereas the electrode film 52B is at a positive potential, the cations in a state of being solvated in the polar solvent move to the electrode film 52A side. At this moment, the anions hardly move in the polymer compound film 51 and thus, in the polymer compound film 51, the electrode film 52A side swells, while the electrode film 52B side shrinks As a result, the polymer actuator elements 131 and 132 curve toward the electrode film 52B side as a whole, as illustrated in FIG. 5B. Subsequently, when the state of no voltage application is established by eliminating the potential difference between the electrode films 52A and 52B (when the application of the driving voltage Vd is stopped), the cationic substance (the cations and the polar solvent) localized to the electrode film 52A side in the polymer compound film 51 disperse, and return to the state illustrated in FIG. 5A. Further, when the predetermined driving voltage Vd is applied between the electrode films 52A and 52B so that the electrode film 52A shifts to a positive potential and the electrode film 52B shifts to a negative potential, from the state of no voltage application illustrated in FIG. 5A, the cations in the state of being solvated in the polar solvent move to the electrode film 52B side. In this case, in the polymer compound film 51, the electrode film 52A side shrinks while the electrode film 52B side swells and thus, as a whole, the polymer actuator elements 131 and 132 curve toward the electrode film 52A side.

Next, a case where an ionic liquid containing liquid cations is used as the cationic substance will be described.

In this case, similarly, in the state of no voltage application, the ionic liquid is dispersed in the polymer compound film 51 approximately uniformly and thus, the polymer actuator elements 131 and 132 become flat as illustrated in FIG. 5A. Here, when a voltage applied state is established by the voltage supply section 181 (application of the driving voltage Vd begins), the polymer actuator elements 131 and 132 exhibit the following behavior. When, for example, the predetermined driving voltage Vd is applied between the electrode films 52A and 52B so that the electrode film 52A is at a negative potential, whereas the electrode film 52B is at a positive potential, the cations of the ionic liquid move to the electrode film 52A side, and the anions hardly move in the polymer compound film 51 which is a cation-exchanger membrane. For this reason, in the polymer compound film 51, the electrode film 52A side swells, while the electrode film 52B side shrinks As a result, the polymer actuator elements 131 and 132 as a whole curve toward the electrode film 52B side, as illustrated in FIG. 5B. Subsequently, when the state of no voltage application is established by eliminating the potential difference between the electrode films 52A and 52B (when the application of the driving voltage Vd is stopped), the cations localized to the electrode film 52A side in the polymer compound film 51 disperse, and return to the state illustrated in FIG. 5A. Further, when the predetermined driving voltage Vd is applied between the electrode films 52A and 52B so that the electrode film 52A shifts to a positive potential and the electrode film 52B shifts to a negative potential from the state of no voltage application illustrated in FIG. 5A, the cations of the ionic liquid move to the electrode film 52B side. In this case, in the polymer compound film 51, the electrode film 52A side shrinks, whereas the electrode film 52B side swells and thus, as a whole, the polymer actuator elements 131 and 132 curve toward the electrode film 52A side.

2. Operation of Variable Capacitance Device 1

Figure 6A:
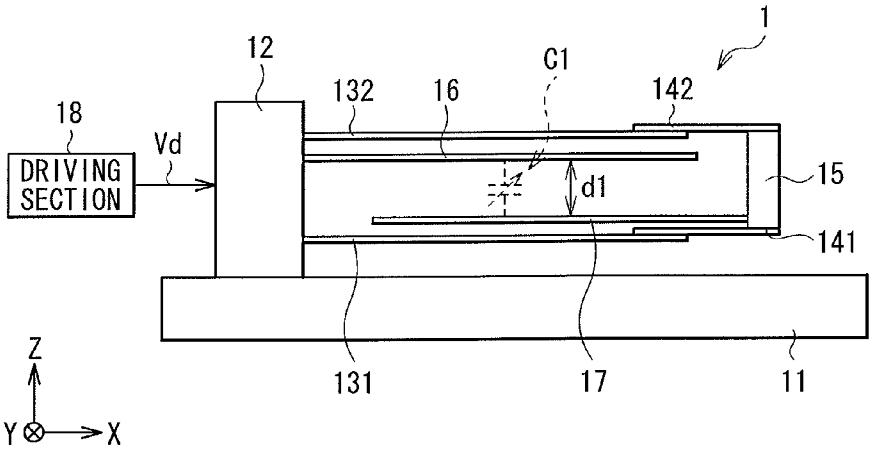
FIGS. 6A and 6B are schematic diagrams for explaining operation of the variable capacitance device illustrated in FIG. 1.
Figure 6B:
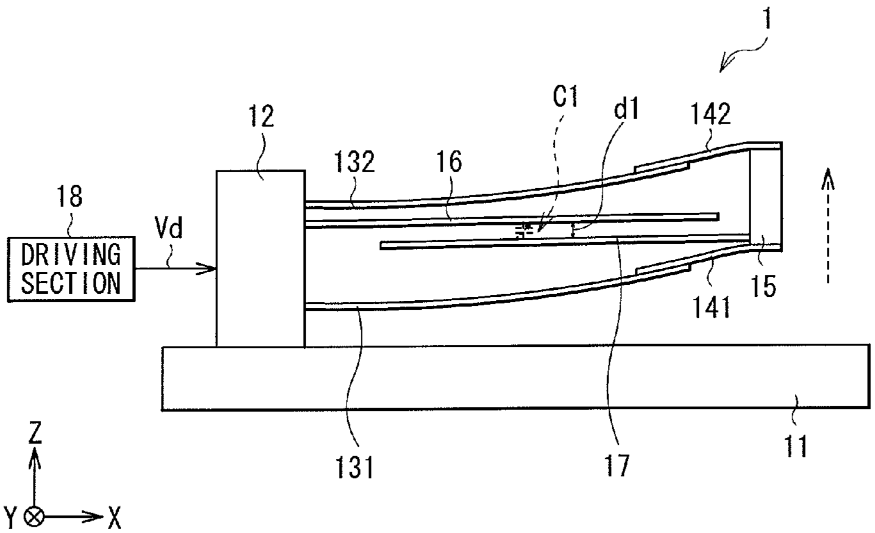

Subsequently, the operation of the entire variable capacitance device 1 will be described with reference to FIGS. 6A and 6B. FIGS. 6A and 6B each illustrate the operation of the variable capacitance device 1, in a cross-sectional diagram (a Z-X cross-sectional diagram). FIG. 6A illustrates a state before the operation, and FIG. 6B illustrates a state after the operation.

In this variable capacitance device 1, the movable electrode 17 is driven via the connection member 15 and the like, according to deformation (a curve) of the pair of polymer actuator elements 131 and 132 described above. This makes the movable electrode 17 become movable (displaceable) along the Z axis as illustrated in FIGS. 6A and 6B.

Then, accompanying such displacement of the movable electrode 17 in the Z-axis direction, the distance d1 between the fixed electrode 16 and the movable electrode 17 changes (here, the distance d1 decreases with the displacement of the movable electrode 17). In other words, in the driving section 18 of the present embodiment, the other end sides of the polymer actuator elements 131 and 132 are deformed (curved) so that the distance d1 between the fixed electrode 16 and the movable electrode 17 changes. Therefore, based on the expression (1) described above, the (electrostatic) capacitance value C of the capacitive element C1 also changes (here, the capacitance value C increases) in response to the change of this distance d1 and therefore, this capacitive element C1 functions as a variable capacitance element.

Here, in the present embodiment, the deformation volume of the actuator element (the polymer actuator elements 131 and 132) is relatively large (for example, around 1 to 2 mm). For this reason, the amount of a change in the distance d1 between the fixed electrode 16 and the movable electrode 17 is also large (for example, around 0 to 2 mm). As a result, in the variable capacitance device 1 of the present embodiment, the capacitance change range in the capacitive element C1 is wider than the capacitance change range in an existing variable capacitance element (for example, an air variable capacitor, a poly variable capacitor, a ceramic trimmer capacitor, a varicap, or the like). In other words, in the variable capacitance device 1, the variable magnification in the capacitive element C1 is greater than the variable magnification in the existing variable capacitance element. Specifically, the capacitance change range in the existing variable capacitance element includes approximately 5 to 15 times variable magnifications, whereas the capacitance change range in the variable capacitance device 1 includes, for example, approximately 20 to 50 times variable magnifications.

Figure 7:
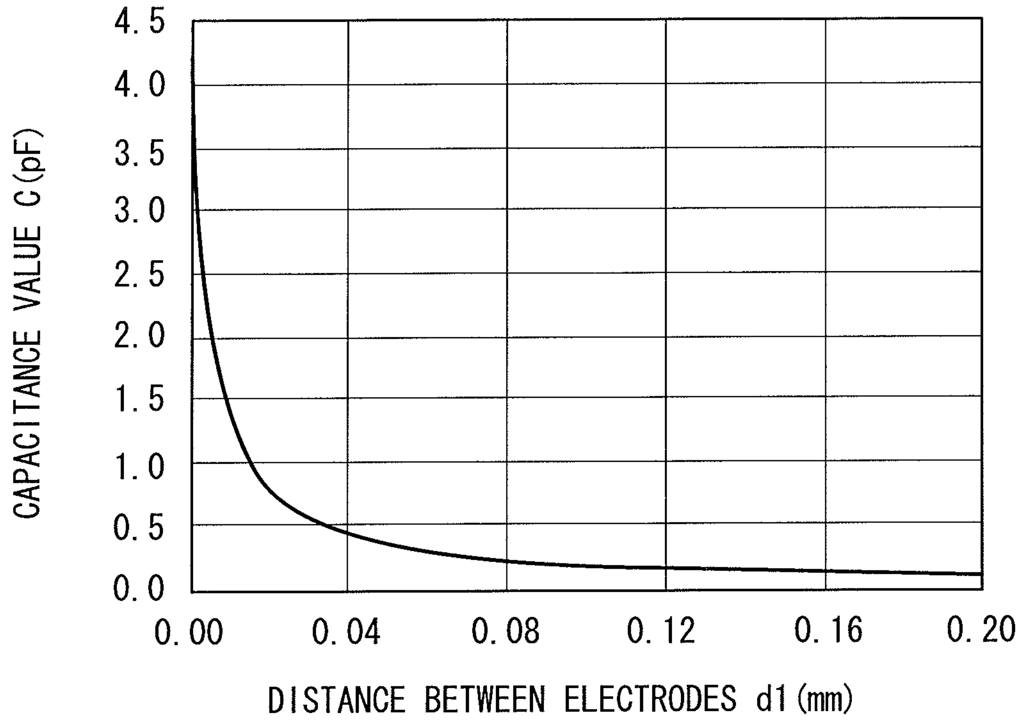
FIG. 7 is a characteristic diagram illustrating an example of a relationship between a distance between electrodes and an electrostatic capacitance value.

FIG. 7 illustrates an example of the relationship between the distance d1 from the fixed electrode 16 to the movable electrode 17 and the capacitance value C in the variable capacitance device 1. Specifically, in this example, the thickness d2 of the dielectric layer 162A is 0.3 mm, the area S of the region where the fixed electrode 16 and the movable electrode 17 face each other is 24 mm2, the dielectric constant $\epsilon 1$ is 1 (air space), and the dielectric constant $\epsilon 2$ of the dielectric layer 162A is 6, in the expression (1) described above. From FIG. 7, it is found that in this example, the distance d1 and the capacitance value C are approximately inversely proportional to each other, and a wide capacitance change range including an approximately 40 times variable magnification is realized.

As described above, in the present embodiment, the other end sides of the polymer actuator elements 131 and 132 are deformed by the driving section 18 so that the distance d1 between the fixed electrode 16 and the movable electrode 17 changes and thus, it is possible to increase the amount of a change in the distance d1 between the fixed electrode 16 and the movable electrode 17. Therefore, the capacitance value of the capacitive element C1 formed using these fixed electrode 16 and movable electrode 17 may also be increased to a great extent and thus, it is possible to realize a capacitance change range wider than before (i.e., a variable magnification larger than before). In addition, such a wide capacitance change range (a large variable magnification) may be realized with a relatively small and simple structure.

Further, in the present embodiment in particular, the polymer actuator elements 131 and 132 are used as actuator elements and thus, compared with a case in which an actuator element in other method (such as a piezoelectric element or a bimetallic element to be described later) is used, the following advantage may be obtained. That is, it is possible to achieve lower power consumption while suppressing the driving voltage Vd to a low level, and production may be realized at low cost.

Furthermore, the fixed electrode 16 has the layered structure including the conductor layer 161 and the dielectric layer 162A provided on the movable electrode 17 side of this conductor layer 161 and thus, the following advantage may be obtained. That is, thanks to the presence of this dielectric layer 162A, it is possible to increase the capacitance value of the capacitive element Cl, and prevent an electrical short circuit (short) between the conductor layers 161 and 171 at the time of displacement of the movable electrode 17. It is to be noted that such a dielectric layer 162A (and the dielectric layer 162B) may not be provided in the fixed electrode 16 in some cases.

In addition, the movable electrode 17 is configured to be driven via the link members 141 and 142 and thus, it is possible to make the movable electrode 17 move easily along the Z axis even when, for example, an operational variation (a variation in the deformation volume) occurs between the pair of polymer actuator elements 131 and 132.

Modifications

Subsequently, modifications (modifications 1 to 6) of the embodiment will be described. It is to be noted that the same elements as those of the embodiment will be provided with the same reference characters as those of the embodiment, and the description will be omitted as appropriate.

Modification 1

Figure 8A:
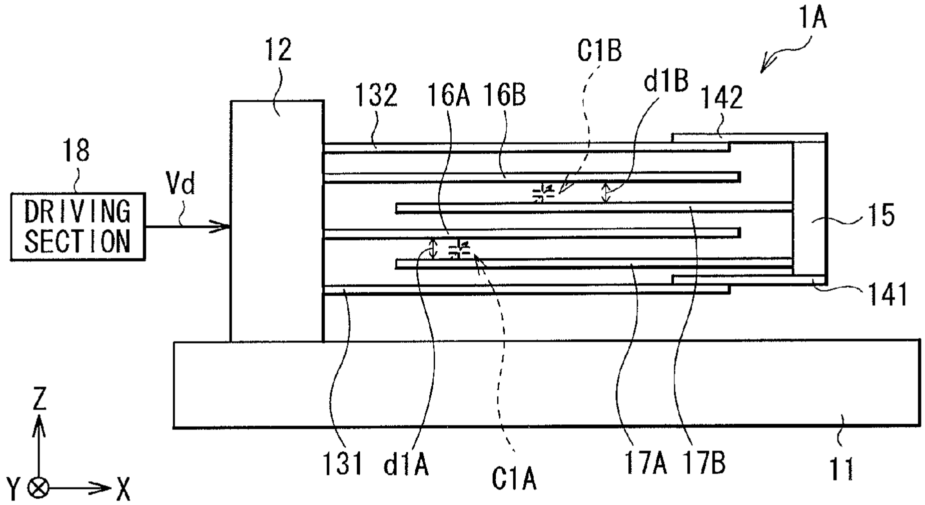
FIGS. 8A and 8B are schematic diagrams illustrating a schematic configuration and operation of a variable capacitance device according to a modification 1.
Figure 8B:
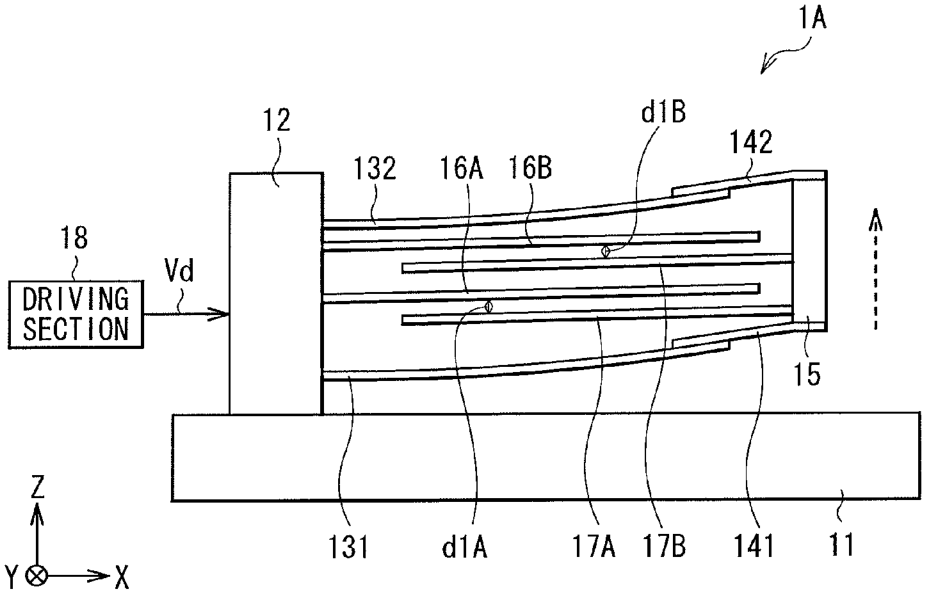

FIGS. 8A and 8B each schematically illustrate an overall configuration (schematic configuration) and operation of a variable capacitance device (a variable capacitance device 1A) according to the modification 1, in a side view (a Z-X side view). FIG. 8A illustrates a state before the operation, and FIG. 8B illustrates a state after the operation.

The variable capacitance device 1A of the present modification is formed such that a plurality of variable capacitance elements are each formed between a fixed electrode and a movable electrode in each of plurality of sets. Specifically, the variable capacitance device 1A is different from the variable capacitance device 1 of the embodiment described above in that two sets of fixed electrodes 16A and 16B and two sets of movable electrodes 17A and 17B are provided in place of the fixed electrode 16 and the movable electrode 17. Otherwise, the variable capacitance device 1A is configured in a manner similar to the variable capacitance device 1.

Each of the fixed electrodes 16A and 16B is an electrode whose one end side fixed by a fixing member 12, and is flat-shaped to extend on an XY plane here. These fixed electrodes 16A and 16B are disposed to face each other (to be approximately parallel with each other) between the pair of polymer actuator elements 131 and 132.

Each of the movable electrodes 17A and 17B is an electrode whose one end side is fixed by a connection member 15. The movable electrodes 17A and 17B are disposed on the other end sides of the polymer actuator elements 131 and 132 via ink members 141 and 142 and the connection member 15, like the movable electrode 17. These movable electrodes 17A and 17B are also flat-shaped to extend on the XY plane, and are disposed between the pair of polymer actuator elements 131 and 132. Specifically, the movable electrode 17A is disposed between the polymer actuator element 131 and the fixed electrode 16A, and the movable electrode 17B is disposed between the fixed electrodes 16A and 16B. In other words, the movable electrode 17A is disposed to approximately face (opposite) the fixed electrode 16A along a Z-axis direction, whereas the movable electrode 17B is disposed to approximately face (opposite) the fixed electrode 16B along the Z-axis direction. Like the movable electrode 17, each of these movable electrodes 17A and 17B is also allowed to shift in the Z-axis direction, according to a displacement (a displacement in the Z-axis direction) of the connection member 15 based on deformation of the polymer actuator elements 131 and 132, as will be described below.

Based on such a configuration, in the variable capacitance device 1A, a capacitive element C1A is formed based on the fixed electrode 16A and the movable electrode 17A disposed to approximately face each other and a space region (a gap) therebetween (and a dielectric layer 162A in the fixed electrode 16A). In addition, a capacitive element C1B is formed based on the fixed electrode 16B and the movable electrode 17B disposed to approximately face (opposite) each other and a space region (a gap) therebetween (and a dielectric layer 162A in the fixed electrode 16B). In other words, in the variable capacitance device 1A, two capacitive elements C1A and C1B are formed using two sets of the fixed electrodes 16A and 16B and the movable electrodes 17A and 17B.

Figure 9A:
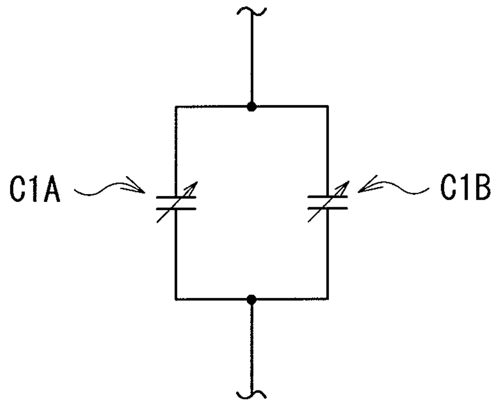
FIGS. 9A and 9B are circuit diagrams each illustrating an example of a connection relationship between two capacitive elements illustrated in FIGS. 8A and 8B.
Figure 9B:
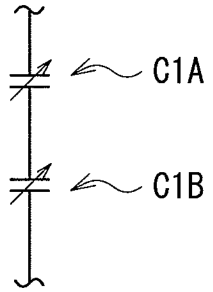

Here, these capacitive elements C1A and C1B may be connected to each other in parallel as illustrated in, for example, FIG. 9A, or in series as illustrated in, for example, FIG. 9B. It is to be noted that in the case of parallel connection, the capacitance value of the variable capacitance device 1A as a whole may be increased (here, to a twofold capacitance value).

In the variable capacitance device 1A of the present modification, as illustrated in FIGS. 8A and 8B, each of the movable electrodes 17A and 17B is driven via the connection member 15 and the like, according to the deformation (curve) of the pair of polymer actuator elements 131 and 132. This makes each of the movable electrodes 17A and 17B become movable (displaceable) along the Z axis. Then, accompanying such displacement of the movable electrodes 17A and 17B in the Z-axis direction, each of a distance d1A between the fixed electrode 16A and the movable electrode 17A and a distance d1B between the fixed electrode 16B and the movable electrode 17B changes (here, the distances d1A and d1B decrease with the displacement of the movable electrodes 17A and 17B). Therefore, like the embodiment described above, according to the change of each of these distances d1A and d1B, the (electrostatic) capacitance value of each of the capacitive elements C1A and C1B also changes (here, the capacitance value increases) and thus, these capacitive elements C1A and C1B each function as a variable capacitance element.

Here, in the present modification, it is also possible to increase the amount of a change in each of the distances d1A and d1B, and increase the capacitance value of each of the capacitive elements C1A and C1B to a large extent, by the operation similar to that in the embodiment described above. Therefore, in the present modification, a capacitance change range wider than before (a variable magnification larger than before) may be realized as well.

It is to be noted that for the present modification, there has been described the case where the two variable capacitance elements are formed using the two sets of the fixed electrode and the movable electrode. However, for example, three or more variable capacitance elements may be formed using three or more sets of the fixed electrode and the movable electrode, and may be combined and used. Specifically, the variable capacitance elements thus formed may be connected to each another in parallel, in series, or in a combination thereof (through parallel connection, serial connection, or connection in a combination thereof).

Modification 2

Figure 10:
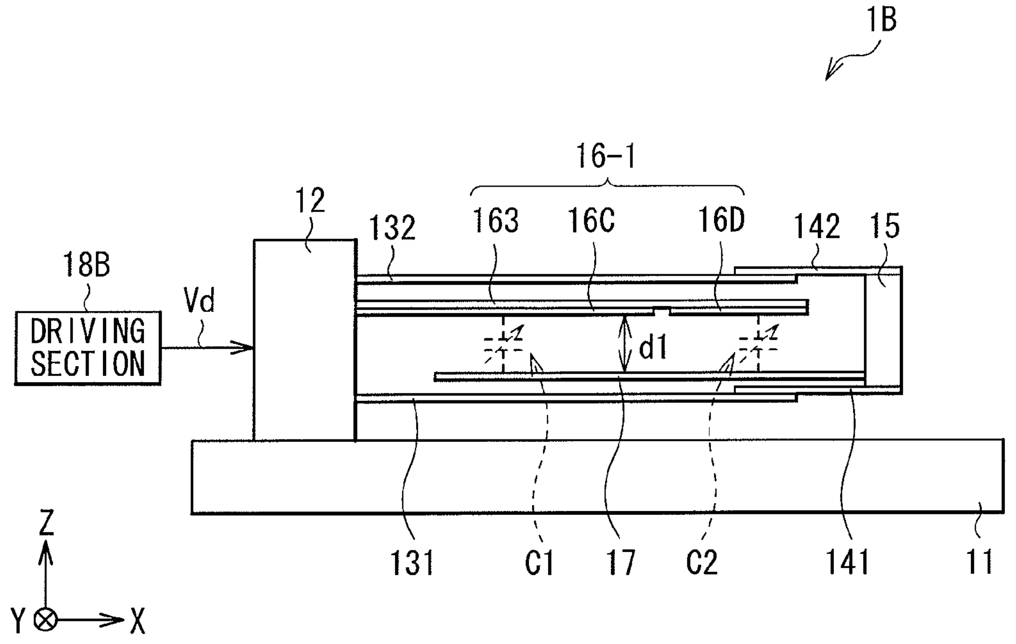
FIG. 10 is a schematic diagram illustrating a schematic configuration of a variable capacitance device according to a modification 2.

FIG. 10 schematically illustrates an overall configuration (schematic configuration) of a variable capacitance device (a variable capacitance device 1B) according to the modification 2, in a side view (a Z-X side view). In the variable capacitance device 1B of the present modification, a capacitance value of a monitoring variable capacitance element (a capacitive element C2 to be described later) to be described below is detected, and a deformation volume (a displacement magnitude, an amount of curve) of each of polymer actuator elements 131 and 132 is controlled using the detected capacitance value.

Specifically, the variable capacitance device 1B is different from the variable capacitance device 1 of the above-described embodiment in that a fixed electrode 16-1 is provided in place of the fixed electrode 16, and a driving section 18B is provided in place of the driving section 18. Otherwise, the variable capacitance device 1B is configured in a manner similar to the variable capacitance device 1.

The fixed electrode 16-1 includes an insulating member 163, and a plurality of (here, two) sub-electrodes 16C and 16D electrically separated from each other on a surface facing the movable electrode 17 in the insulating member 163. In other words, the fixed electrode 16-1 is configured using these two sub-electrode 16C and 16D. The insulating member 163 also functions as a member to support (fix) each of the sub-electrodes 16C and 16D, and is made of, for example, an insulating material such as vinylidene fluoride.

Based on such a configuration, in the variable capacitance device 1B of the present modification, a capacitive element (a variable capacitance element) C1 is formed by using the sub-electrode 16C and the movable electrode 17 disposed to approximately face (opposite) each other, and a space region (a gap) therebetween (and a dielectric layer 162A in the sub-electrode 16C). In addition, a monitoring capacitive element (a variable capacitance element) C2 is formed by using the sub-electrode 16D and the movable electrode 17 disposed to approximately face (opposite) each other, and a space region (a gap) therebetween (and a dielectric layer 162A in the sub-electrode 16D). It is to be noted that in these capacitive elements C1 and C2, the distance between the movable electrode 17 and the sub-electrode 16C or the sub-electrode 16D is d1 in both cases.

Figure 11:
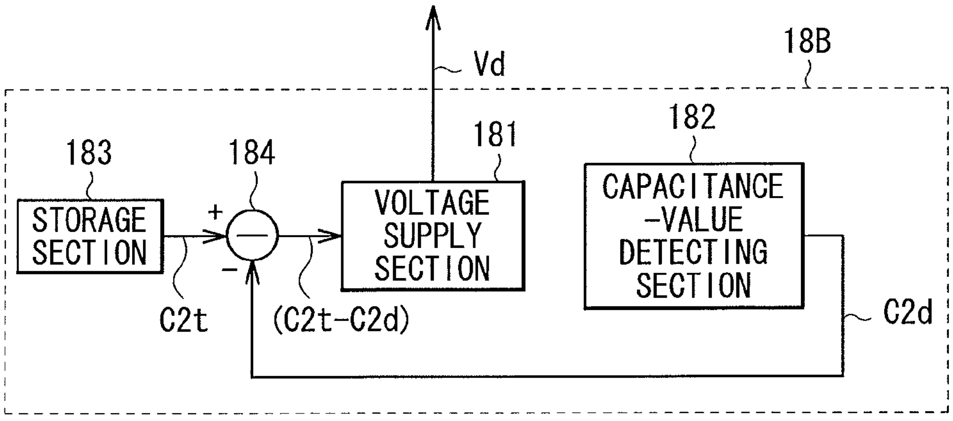
FIG. 11 is a block diagram illustrating an example of a detailed configuration of a driving section illustrated in FIG. 10.

The driving section 18B has, as illustrated in FIG. 11, a capacitance-value detecting section 182, a storage section 183, and a subtraction section 184, in addition to a voltage supply section 181 similar to that described above.

Figure 12:
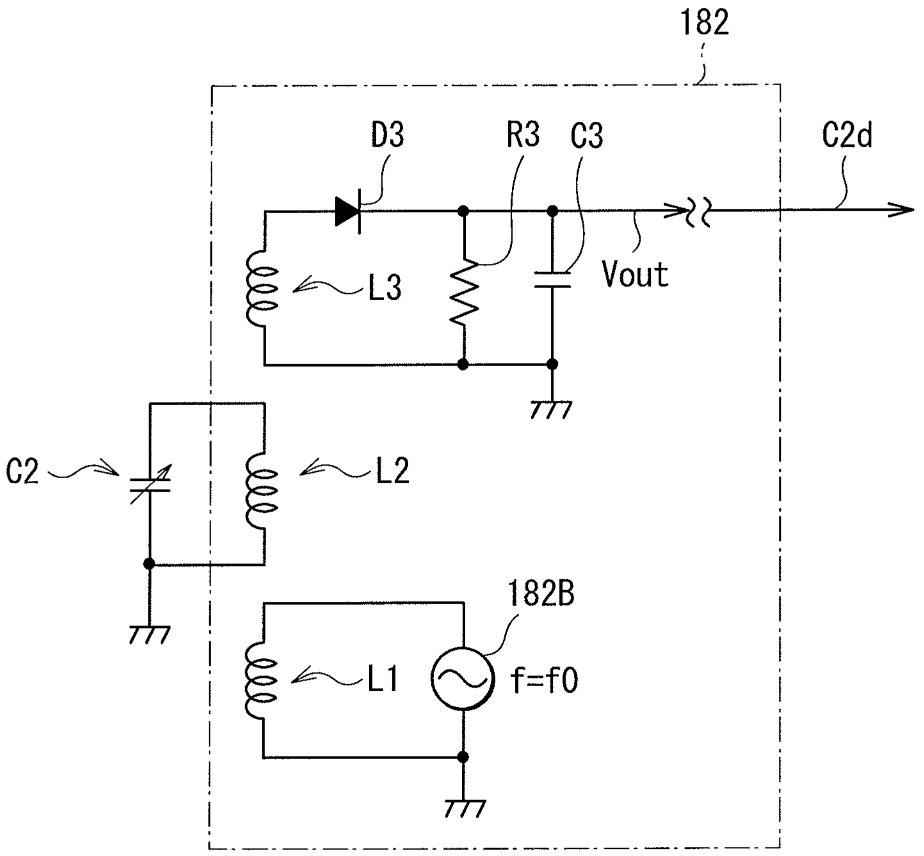
FIG. 12 is a circuit diagram illustrating an example of a detailed configuration of a capacitance-value detecting section illustrated in FIG. 11.

The capacitance-value detecting section 182 detects the capacitance value of the monitoring capacitive element C2 described above. This capacitance-value detecting section 182 includes, as illustrated in FIG. 12, for example, an oscillating circuit 182B producing an alternating current signal at a frequency of frequency f=f0, three inductors L1, L2, and L3 electromagnetically coupled to each other, a diode (a rectifying device) D3, a resistor R3, and a capacitive element (a capacitor) C3. The inductor L1 is connected between both ends of the oscillating circuit 182B, and the inductor L2 is connected between both ends of the monitoring capacitive element C2. Of the inductor L3, one end is connected to an anode of the diode D3, and the other end is connected to one end of the resistor R3 and one end of the capacitive element C3. A cathode of the diode D3 is connected to the other end of the resistor R3 and the other end of the capacitive element C3. Based on such a connection configuration, a resonance circuit (an LC resonance circuit) is configured by using the inductor L2 and the monitoring capacitive element C2, and a detector circuit is configured by using the inductor L3, the diode D3, the resistor R3, and the capacitive element C3.

Figure 13:
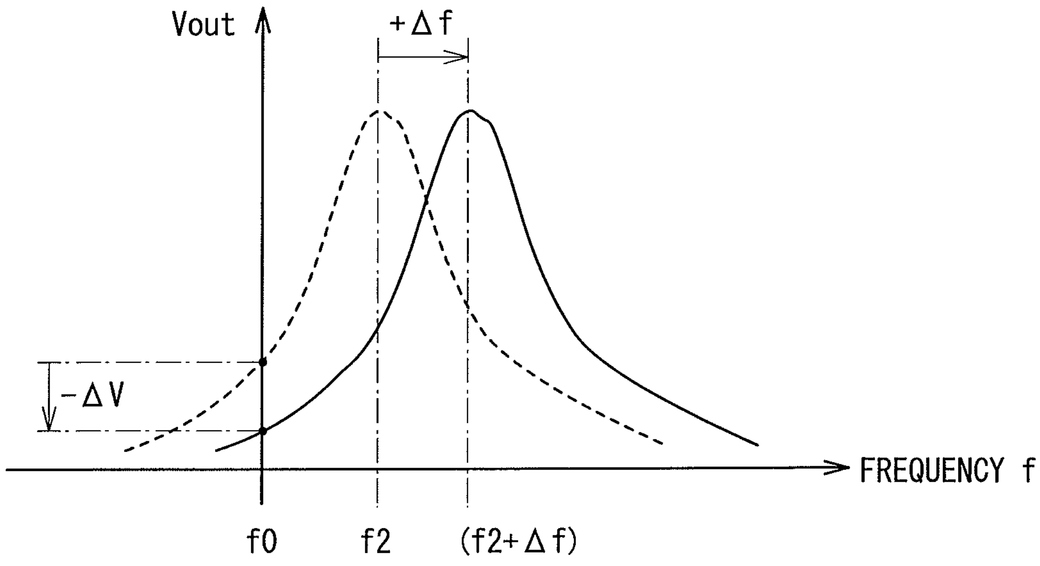
FIG. 13 is a characteristic diagram for explaining detection operation in the capacitance-value detecting section illustrated in FIG. 12.

In this capacitance-value detecting section 182, specifically, the capacitance value of the monitoring capacitive element C2 is detected in the following manner. First, in the LC resonance circuit described above, for example, resonant operation (LC resonant operation) having a resonance characteristic as illustrated in FIG. 13 is performed. At this time, when the inductance of the inductor L2 is assumed to be L, and the capacitance value of the capacitive element C2 is assumed to be C2, a resonant frequency f2 in this resonant operation is expressed by the following expression (2). Here, when the capacitance value in the capacitive element C2 changes, the resonant frequency f2 changes (shifts) therewith based on the expression (2) and therefore, a detection output (an output voltage Vout) at a frequency f0 in the oscillating circuit 182B changes as well. For example, as illustrated in FIG. 13, when the resonant frequency changes from f2 to (f2+Δf) by accompanying the change in the capacitance value of the capacitive element C2, the value of the output voltage Vout at the frequency f0 also changes (here, decreases only by −ΔV). Here, the capacitance value in the capacitive element C2 and the output voltage Vout correspond to each other in a one-to-one relationship and thus, it is possible to also detect (measure) the capacitance value of the capacitive element C2 by detecting this output voltage Vout. It is to be noted that the capacitance value of the capacitive element C2 thus detected by the capacitance-value detecting section 182 is assumed to be a capacitance value C2*d*.

$$f2=1/\{2\pi\times(L\times C2)^{1/2}\} \quad (2)$$

The storage section 183 illustrated in FIG. 11 is a memory to store (hold) beforehand a capacitance value C2*t* that is "a predetermined target value" in the capacitive element C2, and may be configured using any of various types of memory. The subtraction section 184 performs subtraction processing between the capacitance value C2*t* held in the storage section 183 and the capacitance value C2*d* detected by the capacitance-value detecting section 182 (specifically, performs processing of subtracting the capacitance value C2*d* from the capacitance value C2*t*). As a result, a capacitance value (C2*t*−C2*d*) obtained by the subtraction is outputted to the voltage supply section 181.

In the voltage supply section 181 of the present modification, the deformation volumes of the polymer actuator elements 131 and 132 are controlled using the capacitance value C2*d* of the monitoring capacitive element C2 detected by the capacitance-value detecting section 182. Specifically, using the capacitance value (C2*t*−C2*d*) supplied from the subtraction section 184, the deformation volumes of the polymer actuator elements 131 and 132 are controlled so that this capacitance value C2*d* of the capacitive element C2 approximately agrees (preferably, matches) with the predetermined target value (the capacitance value C2*t*). In other words, here, the deformation volumes of the polymer actuator elements 131 and 132 are controlled by adjusting the value of the driving voltage Vd so that the value of the capacitance value (C2*t*−C2*d*) approaches 0 (zero) (preferably, becomes 0).

In this way, in the variable capacitance device 1B of the present modification, the deformation volumes of the polymer actuator elements 131 and 132 are controlled in the voltage supply section 181, by using the capacitance value C2*d* of the monitoring capacitive element C2 detected by the capacitance-value detecting section 182. Therefore, it is possible to accurately adjust the capacitance value of the capacitive element C1 actually used to a desired value, without being affected by vibration or a postural difference of the variable capacitance device 1B.

It is to be noted that for the present modification, the case where the monitoring variable capacitance element is formed using two sub-electrodes has been described, but, for example, three or more variable capacitance elements may be formed using three or more sub-electrodes, and one of these variable capacitance elements may be used as the monitoring variable capacitance element.

Modifications 3 and 4

Figure 14A:
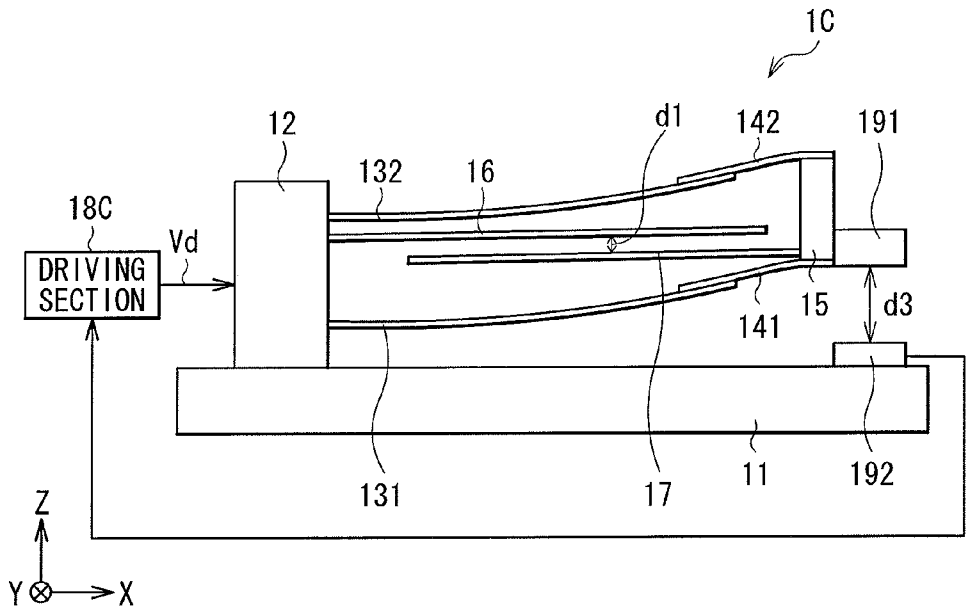
FIGS. 14A and 14B are schematic diagrams illustrating schematic configurations of variable capacitance devices according to modifications 3 and 4, respectively.
Figure 14B:
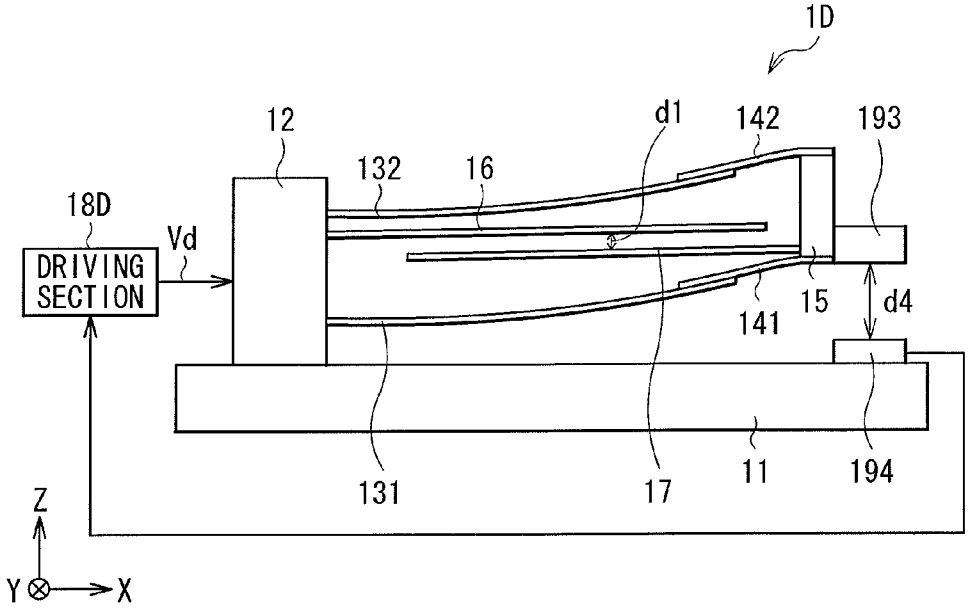

FIG. 14A schematically illustrates an overall configuration (schematic configuration) of a variable capacitance device (a variable capacitance device 1C) according to the modification 3, in a side view (a Z-X side view). Further, FIG. 14B schematically illustrates an overall configuration (schematic configuration) of a variable capacitance device (a variable capacitance device 1D) according to the modification 4, in a side view (a Z-X side view). In these modifications 3 and 4, a displacement magnitude (the amount of travel) of a movable electrode 17 is detected, and a deformation volume (a displacement magnitude, a curving amount) of each of polymer actuator elements 131 and 132 is controlled by using the detected displacement magnitude.

The variable capacitance device 1C of the modification 3 illustrated in FIG. 14A is different from the variable capacitance device 1 of the embodiment described above in that a driving section 18C is provided in place of the driving section 18, and a magnet 191 and a Hall element 192 are further provided. Otherwise, the variable capacitance device 1C is configured in a manner similar to the variable capacitance device 1. The magnet 191 and the Hall element 192 correspond to a specific example of the "displacement-magnitude detecting section" according to the embodiment.

The magnet 191 is disposed on a connection member 15 (here, on a side surface), and is made of, for example, a magnetic material such as a compound (Nd2Fe14B) of neodymium (Nd)—iron (Fe)—boron (B). The Hall element 192 is disposed on a support member 11 at a position facing the magnet 191, and detects the intensity of a magnetic field produced by the magnet 191. It is to be noted that the intensity of the magnetic field may be detected using a magneto-resistive element (MR element), instead of using the Hall element 192. In the driving section 18C, the deformation volumes of the polymer actuator elements 131 and 132 are controlled using the intensity of the magnetic field (corresponding to a displacement magnitude of the movable electrode 17, and a distance d3 between the magnet 191 and the Hall element 192) detected by the Hall element 192. Specifically, the driving section 18C controls the deformation volumes of the polymer actuator elements 131 and 132 by adjusting the value of a driving voltage Vd.

Meanwhile, the variable capacitance device 1D of the modification 4 illustrated in FIG. 14B is different from the variable capacitance device 1 in the embodiment described above in that a driving section 18D is provided in place of the driving section 18, and a reflection member 193 and a photo-reflector 194 are further provided. Otherwise, the variable capacitance device 1D is configured in a manner similar to the variable capacitance device 1. The reflection member 193 and the photo-reflector 194 correspond to a specific example of the "displacement-magnitude detecting section" according to the embodiment.

The reflection member 193 is disposed on a connection member 15 (here, on a side surface), and is made of, for example, a metallic material such as aluminum (Al). The photo-reflector 194 is disposed on a support member 11 at a position facing the reflection member 193, and is formed by containing a Light Emitting Diode (LED) and a phototransistor in a single package. In the photo-reflector 194, the quantity of light (reflected light) reflected by the reflection member 193 after being emitted from the LED is detected by the phototransistor. In the driving section 18D, the deformation volumes of the polymer actuator elements 131 and 132 are controlled using the quantity of reflected light detected by the photo-reflector 194 (corresponding to a displacement magnitude of the movable electrode 17, and a distance d4 between the reflection member 193 and the photo-reflector 194). Specifically, the driving section 18D controls the deformation volume of each of the polymer actuator elements 131 and 132 by adjusting the value of a driving voltage Vd.

In this way, in the modifications 3 and 4, the displacement magnitude of the movable electrode 17 is detected, and the deformation volumes of the polymer actuator elements 131 and 132 are controlled using the detected displacement magnitude. Therefore, it is possible to reliably adjust the capacitance value C of the capacitive element C1 to a desired value, without being affected by vibration and a postural difference of each of the variable capacitance devices 1C and 1D.

Modification 5

FIG. 15 illustrates a schematic configuration and operation of each of piezoelectric elements 231 and 232 each serving as an actuator element applied to a variable capacitance device according to the modification 5. In the variable capacitance device of the present modification, the piezoelectric elements 231 and 232 to be described below are provided in place of the polymer actuator elements 131 and 132 of the embodiment described above.

Each of these piezoelectric elements 231 and 232 includes a conductive plate 61 extending on an XY plane, a pair of piezoelectric bodies 62A and 62B disposed on both sides of this conductive plate 61, and a pair of fixing members 63A and 63B to fix one end side of each of the conductive plate 61 and the piezoelectric bodies 62A and 62B.

The conductive plate 61 is made of, for example, a material such as phosphor bronze. The piezoelectric bodies 62A and 62B are each made of, for example, a piezoelectric material such as lead zirconate titanate (PZT). It is to be noted that these piezoelectric bodies 62A and 62B are assumed to be each subjected to predetermined polarization treatment along a thickness direction thereof (a Z-axis direction), and have the same polarization directions.

In the piezoelectric elements 231 and 232 thus configured, when a predetermined driving voltage Vd is applied to each of the piezoelectric bodies 62A and 62B, one of the piezoelectric bodies (here, the piezoelectric body 62A) stretches along the X-axis direction, while the other (here, the piezoelectric body 62B) shrinks along the X-axis direction. As a result, the piezoelectric elements 231 and 232 as a whole curve (bend) along the thickness direction (the Z-axis direction), and a deformation volume d in the Z-axis direction is produced. It is to be noted that when the polarity of the driving voltage Vd is reversed, the deformation volume d in the reverse direction is obtained. In this way, each of the piezoelectric elements 231 and 232 functions as an actuator element by being supplied with the driving voltage Vd.

Therefore, in the variable capacitance device of the present modification in which these piezoelectric elements 231 and 232 are used as actuator elements, it is also possible to obtain an effect similar to that in the embodiment described, by similar operation.

Modification 6

FIGS. 16A and 16B each illustrate a schematic configuration and operation of bimetallic elements 331 and 332 each serving as an actuator element applied to a variable capacitance device according to the modification 6, in a schematic diagram. FIG. 16A illustrates a state before the operation, and FIG. 16B illustrates a state after the operation. In the variable capacitance device of the present modification, the bimetallic elements 331 and 332 to be described below are provided in place of the polymer actuator elements 131 and 132 of the embodiment described above.

Each of these the bimetallic elements 331 and 332 includes a pair of metal plates (a high-expansion metal plate 72A and a low-expansion metal plate 72B different from each other in coefficient of thermal expansion) extending on an XY plane, and a pair of fixing members 73A and 73B fixing the one end side of each of these metal plates. The high-expansion metal plate 72A and the low-expansion metal plate 72B form a layered structure by being adhered to each other.

Each of the high-expansion metal plate 72A and the low-expansion metal plate 72B is made of, for example, a material obtained by adding a metal such as manganese (Mn), chromic (Cr), or copper (Cu) to an alloy of iron (Fe) and nickel (Ni). The respective coefficients of thermal expansion are made to be different from each other by varying the respective amounts of addition.

In the bimetallic elements 331 and 332 thus configured, the high-expansion metal plate 72A expands more than the low-expansion metal plate 72B, in a state in which the temperature is higher than that in a flat state (the state before the operation) illustrated in FIG. 16A. As a result, the bimetallic elements

331 and 332 as a whole curve (bend) along a thickness direction (a Z-axis direction), and a deformation volume d of the Z-axis direction is produced. Therefore, each of the bimetallic elements 331 and 332 functions as an actuator element, by changing the temperature of each of the high-expansion metal plate 72A and the low-expansion metal plate 72B using a heating means such as a not-illustrated heater.

Therefore, in the variable capacitance device of the present modification in which these bimetallic elements 331 and 332 are used as actuator elements, it is also possible to obtain an effect similar to that in the embodiment described above by similar operation.

Application Example

Next, an application example (an example of application to an antenna module and a communication apparatus) of the variable capacitance devices according to the embodiment and the modifications 1 to 6 described above (the variable capacitance devices 1, 1A to 1D and the like) will be described.

Figure 17:
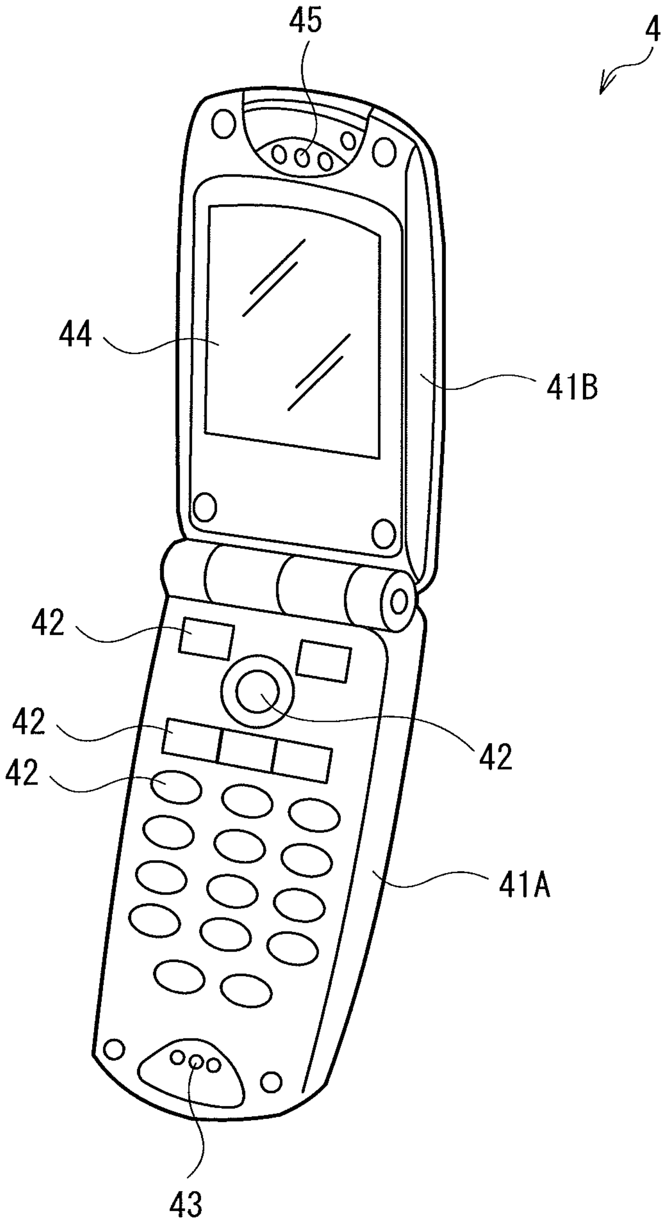
FIG. 17 is a perspective diagram illustrating an example of a schematic configuration of a communication apparatus according to an application example of the variable capacitance device of each of the embodiment and the modifications.
Figure 18:
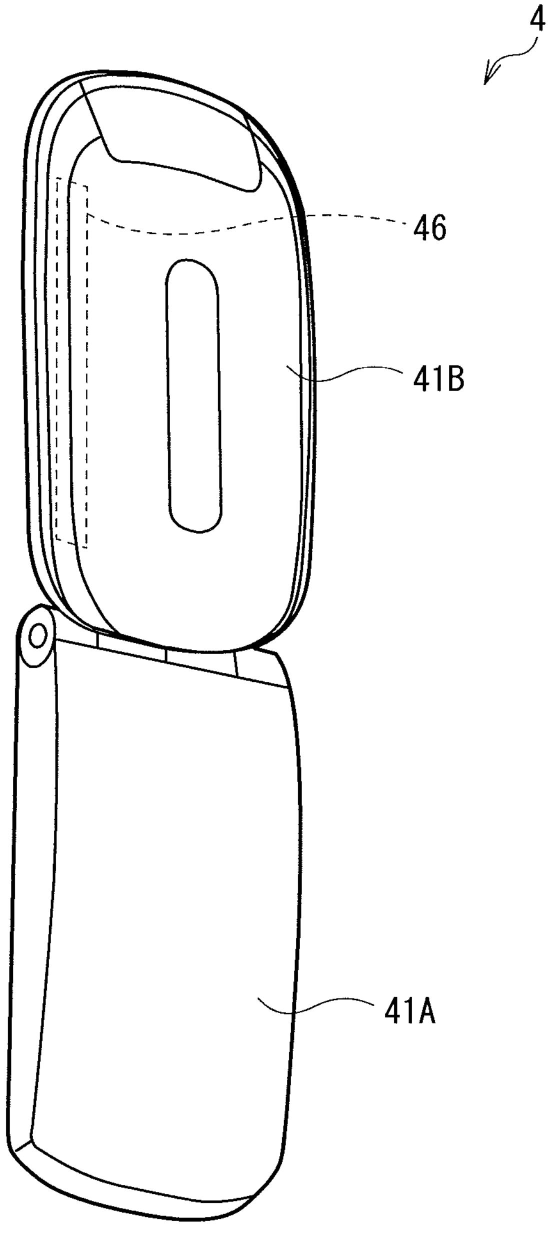
FIG. 18 is a perspective diagram illustrating the communication apparatus illustrated in FIG. 17, when viewed from a different direction.

FIG. 17 and FIG. 18 are perspective diagrams each illustrating a schematic configuration of a communication apparatus (a portable telephone 4) according to the application example of the variable capacitance devices of the above-described embodiment and the like. In this portable telephone 4, two housings 41A and 41B are foldably coupled to each other through a not-illustrated hinge mechanism.

As illustrated in FIG. 17, in a surface on one side of the housing 41A, various operation keys 42 are disposed, and a microphone 43 is disposed below the operation keys 42. The operation keys 42 are intended to receive predetermined operation by a user and thereby input information. The microphone 43 is intended to input voice of the user during a call and the like.

As illustrated in FIG. 17, a display section 44 using a liquid-crystal display panel or the like is disposed in a surface on one side of the housing 41B, and a speaker 45 is disposed at an upper end thereof. The display section 44 displays various kinds of information such as a radio-wave receiving status, a remaining battery, a telephone number of a party on the other end of the line, contents (telephone numbers, names, and the like of other parties) recorded as a telephone book, an outgoing call history, an incoming call history, and the like, for example. The speaker 45 is intended to output the voice of a party on the other end of the line during a call and the like.

As illustrated in FIG. 18, inside a surface on the other side of the housing 41B, an antenna module 46 having any of the variable capacitance devices according to the embodiment and the like is disposed.

Figure 19A:
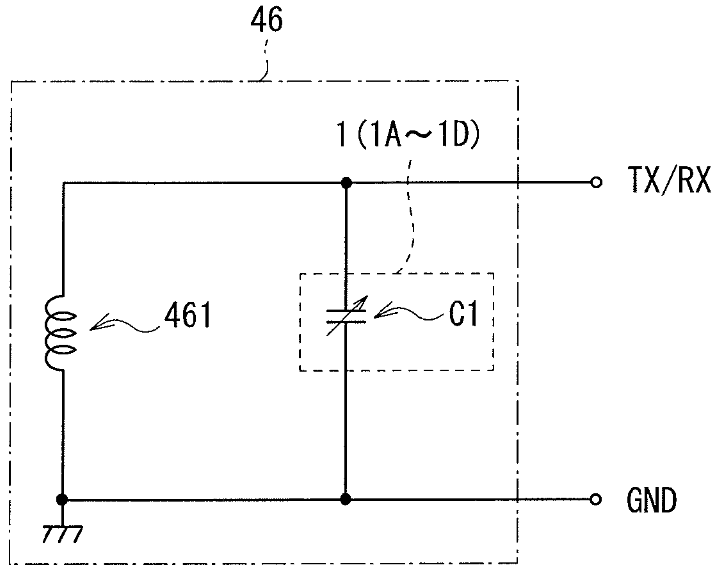
FIGS. 19A and 19B are circuit diagrams illustrating an example of a detailed configuration of an antenna module illustrated in FIG. 18, in comparison with a configuration of an antenna module according to a comparative example.

FIG. 19A illustrates a main circuit configuration of the antenna module 46. This antenna module 46 has an antenna element 461, and the variable capacitance device 1 (or any of 1A to 1D and the like) including a capacitive element C1 (variable capacitance element) in the above-described embodiment or the like.

In the antenna module 46 having such a configuration, compared with an existing antenna module, it is possible to obtain the following advantage by being configured using the variable capacitance device 1 (or any of 1A to 1D and the like) of the above-described embodiment or the like.

First, in a portable terminal (a communication apparatus) having a wireless communication function represented by a portable telephone, in recent years, progress has been made in multiband of frequency in use, or multimode of a mounted system, in order to speed up communication data and improve convenience. In particular, recently, multiband-multimode portable telephones, smartphones etc. which are allowed to use both a GSM (Global System for Mobile Communications) method and a UMTS (Universal Mobile Telephone System) method (a W-CDMA (Wideband Code Division Multiple Access) method) have become widespread. In such a portable terminal (communication apparatus), it is desirable to combine wireless communication systems employing various methods, such as Near Field Communication (NFC) represented by Bluetooth (registered trademark), WLAN (Wireless Local Area Network), FeliCa (non-contact IC card: registered trademark), in addition to GPS (Global Positioning System), one segment (one-segment partial reception service for a portable telephone and a portable terminal), and the like, for example.

Figure 19B:
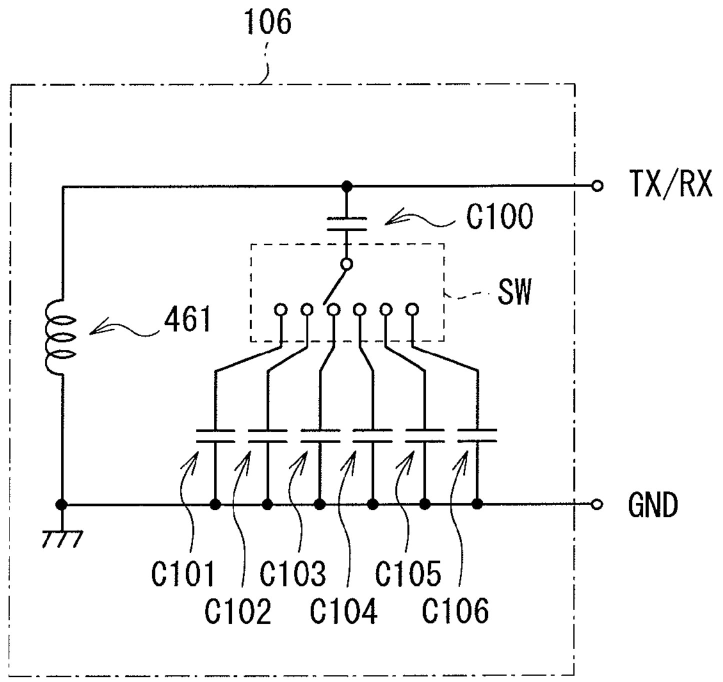
FIG. 19B RELATED ART

Here, in an antenna module 106 of related art according to a comparative example illustrated in FIG. 19B, band switching among the wireless communications systems employing such multiple methods is realized as follows. That is, impedance adjustment elements the number of which is the same as the number of bands thereof (here, one fixed capacitive element C100 and six fixed capacitive elements C101 to C106) are prepared beforehand, and connection with those impedance adjustment elements is switched by a switching element SW, and thereby the band switching is realized. However, in such a configuration, the impedance adjustment elements (here, fixed capacitive elements) are necessitated first. In addition, the switching element SW to switch them is desired to be an element having small loss while suppressing high power and thus, it has been desired to use a relatively expensive component such as a gallium arsenide (GaAs) switch or the like. For these reasons, in the antenna module 106 of related art, the configuration is complicated and large, increasing the production cost.

In contrast, in the antenna module 46 according to the present application example illustrated in FIG. 19A, the variable capacitance device 1 or the like described above in the embodiment or the like is the only element desired for band switching and thus, the configuration of a transmitter-receiver circuit may be extremely simplified. Further, it is possible to change the capacitance value in the variable capacitance element C1 continually and thus, a large number of bands may be selected (in theory, infinite). Furthermore, a wide capacitance value range from a small capacitance value to a large capacitance value may be covered by a single variable capacitance element and thus, a combination of wireless communications systems of multiple methods is realized with a simple configuration.

Other Modifications

The present technology has been described by using the embodiment, modifications, and application example. However, the present technology is not limited to these embodiment and the like, and may be variously modified.

For example, the connection member 15 and the link members 141 and 142 described above in the embodiment and the like may not be provided in some cases. Further, the embodiment and the like have been described for the case where the one end side of the actuator element is directly fixed by the fixing member 12 has been described, but the present technology is not limited to this case. In other words, the one end side of the actuator element may be fixed by the fixing member 12 indirectly (through the fixed electrode 16 and the like). Furthermore, the embodiment and the like have been described for the case where the movable electrode 17 is provided to connect to the actuator element indirectly, but the present technology is not limited to this case. In other words, the movable electrode 17 may be provided to connect to the actuator element directly (the movable electrode 17 may be formed in a part (surface or the like) of the actuator element).

Further, the embodiment and the like have been described mainly for the case where the pair of actuator elements are provided. However, the actuator elements may not be in a pair, and one actuator element or three or more actuator elements may be provided.

Furthermore, the shape of each actuator element is not limited to those in the embodiment and the like, and also, the layered structure is not limited to those described in the embodiment and the like, and may be changed as appropriate. Moreover, the shape and the material of each member in the variable capacitance device are not limited to those described in the embodiment and the like.

In addition, the variable capacitance device according to the embodiment is not limited to the application to the antenna module and the communication apparatus (portable telephone) described in the application example, and may be applied to other types of electronic apparatus and the like.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A variable capacitance device comprising:
- a fixing member;
- a fixed electrode having a first end side fixed by the fixing member;
- an actuator element having a first end side fixed by the fixing member directly or indirectly, wherein the actuator element is a polymer actuator element including a pair of electrode films and a polymer film inserted between the pair of electrode films;
- a movable electrode provided to connect to the actuator element directly or indirectly, and disposed to approximately face the fixed electrode; and
- a driving section deforming a second end side of the actuator element, to change a distance between the fixed electrode and the movable electrode.

2. The variable capacitance device according to claim 1, further comprising:
- a plurality of the actuator elements; and
- a connection member making connection between a second end side of each of the actuator elements and the first end side of the movable electrode.

3. The variable capacitance device according to claim 2, further comprising:
- a link member making a link between the second end side of each of the actuator elements and the connection member,
- wherein the link member has rigidity equal to or less than rigidity of each of the actuator elements.

4. The variable capacitance device according to claim 1, wherein a plurality of sets of the fixed electrode and the movable electrode are provided.

5. The variable capacitance device according to claim 4, wherein a plurality of variable capacitance elements formed using the plurality of sets of the fixed electrode and the movable electrode are connected to each other in parallel, in series, or in a combination thereof.

6. The variable capacitance device according to claim 1,
- wherein the fixed electrode is configured by using a plurality of sub-electrodes electrically separated from each other on a surface facing the movable electrode,
- the variable capacitance device further comprises a capacitance-value detecting section detecting a capacitance value of a monitoring variable capacitance element formed using one of the plurality of sub-electrodes and the movable electrode, and the driving section controls a deformation volume of the actuator element, by using the capacitance value of the monitoring variable capacitance element detected by the capacitance-value detecting section.

7. The variable capacitance device according to claim 6, wherein the driving section controls the deformation volume of the actuator element, to make the detected capacitance value of the monitoring variable capacitance element approximately agree with a predetermined target value.

8. The variable capacitance device according to claim 1, further comprising:
- a displacement-magnitude detecting section detecting a displacement magnitude of the movable electrode,
- wherein the driving section controls a deformation volume of the actuator element, by using the displacement magnitude detected by the displacement-magnitude detecting section.

9. The variable capacitance device according to claim 1, wherein the fixed electrode has a layered structure including a conductor layer and a dielectric layer provided on the movable electrode side of the conductor layer.

10. The variable capacitance device according to claim 1, wherein the polymer actuator element is electrically connected to the fixed electrode.

11. The variable capacitance device according to claim 10, wherein a driving voltage from the driving section is supplied to the polymer actuator element.

12. The variable capacitance device according to claim 1, wherein the polymer film is impregnated with an ionic substance.

13. An antenna module comprising:
- an antenna element; and
- a variable capacitance device,
- wherein the variable capacitance device includes
- a fixing member,
- a fixed electrode having a first end side fixed by the fixing member,
- an actuator element having a first end side fixed by the fixing member directly or indirectly, wherein the actuator element is a polymer actuator element including a pair of electrode films and a polymer film inserted between the pair of electrode films,
- a movable electrode provided to connect to the actuator element directly or indirectly, and disposed to approximately face the fixed electrode, and
- a driving section deforming a second end side of the actuator element, to change a distance between the fixed electrode and the movable electrode.

14. A communication apparatus comprising:
- an antenna module including an antenna element and a variable capacitance device,
- wherein the variable capacitance device includes
- a fixing member,
- a fixed electrode having a first end side fixed by the fixing member,
- an actuator element having a first end side fixed by the fixing member directly or indirectly, wherein the actuator element is a polymer actuator element including a pair of electrode films and a polymer film inserted between the pair of electrode films,
- a movable electrode provided to connect to the actuator element directly or indirectly, and disposed to approximately face the fixed electrode, and a driving section deforming a second end side of the actuator element, to change a distance between the fixed electrode and the movable electrode.

* * * * *